US007665143B2

(12) United States Patent
Havens et al.

(10) Patent No.: US 7,665,143 B2
(45) Date of Patent: Feb. 16, 2010

(54) CREATING SECURE PROCESS OBJECTS

(75) Inventors: Darryl E. Havens, Bothell, WA (US); Arun U. Kishan, Bellevue, WA (US); Richard B. Ward, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 837 days.

(21) Appl. No.: 11/129,872

(22) Filed: May 16, 2005

(65) Prior Publication Data

US 2006/0259487 A1  Nov. 16, 2006

(51) Int. Cl.
H04L 29/06 (2006.01)

(52) U.S. Cl. .............................. 726/26; 726/2; 713/164; 713/166; 719/315

(58) Field of Classification Search .................. 380/30; 707/10, 100; 711/147–152; 713/152, 167–193, 713/164, 166; 718/100–107; 719/310, 315, 719/330, 329; 726/22–30, 2
See application file for complete search history.

(56) References Cited

U.S. PATENT DOCUMENTS

| | | | | |
|---|---|---|---|---|
| 5,295,266 A | * | 3/1994 | Hinsley et al. ............... | 718/101 |
| 5,717,926 A | * | 2/1998 | Browning et al. ............ | 718/104 |
| 7,039,801 B2 | * | 5/2006 | Narin .......................... | 713/152 |
| 7,406,603 B1 | * | 7/2008 | MacKay et al. .............. | 713/193 |
| 2005/0251803 A1 | * | 11/2005 | Turner et al. ................. | 718/100 |
| 2006/0212945 A1 | * | 9/2006 | Donlin et al. ................. | 726/29 |
| 2006/0248594 A1 | * | 11/2006 | Grigorovitch et al. ......... | 726/26 |
| 2008/0040800 A1 | * | 2/2008 | Park ............................ | 726/22 |

* cited by examiner

Primary Examiner—Taghi Arani
Assistant Examiner—Thaddeus Plecha
(74) Attorney, Agent, or Firm—Woodcock Washburn LLP

(57) ABSTRACT

A secure process may be created which does not allow code to be injected into it, does not allow modification of its memory or inspection of its memory. The resources protected in a secure process include all the internal state and threads running in the secure process. Once a secure process is created, the secure process is protected from access by non-secure processes. Process creation occurs atomically in kernel mode. Creating the infrastructure of a process in kernel mode enables security features to be applied that are difficult or impossible to apply in user mode. By moving setup actions previously occurring in user mode such as creating the initial thread, allocating the stack, initialization of the parameter block, environment block and context record into kernel mode, the need of the caller for full access fights to the created process is removed.

16 Claims, 7 Drawing Sheets

CREATING SECURE PROCESS OBJECTS

FIELD OF THE INVENTION

The invention relates to processes in computers and in particular to creating secure process objects.

BACKGROUND OF THE INVENTION

A computer program (or simply "program") is a sequence of instructions that define the actions or computations that will be carried out by a computer when the instructions are loaded and executed. To run a program, the computer is initialized to a starting state, the program and sometimes data are loaded and some mechanism that executes the loaded instructions is invoked. In most computers, an operating system loads and executes the program. In this context, a program refers to an individual executable image rather than all the programming currently running on the computer. Thus the word "program" describes a single, complete and more-or-less self-contained list of instructions, often stored in a single file, whereas "code" and "software" are words of indefinite number describing some number of instructions which may constitute one or more programs or parts thereof.

System software is any software required to support the production or execution of application programs but which is not specific to any particular application. The operating system, compilers, editors and sorting programs are well-known examples of system software. Application programs typically perform a special function: word-processing or computer-aided-design (CAD), for example. Most programs rely heavily on various kinds of operating system software for their execution.

While the word "program" refers to a static binary image that contains a set of instructions that can be executed, a "process" is the operating system's representation of a container that is used to load and execute code. The code executed by a process exists in its address space; the code may be loaded into the address space from an executable program or library file, or it may be dynamically generated by code already executing in the process.

In general, a process includes memory, (typically a region of virtual memory for suspended processes) which contains the executable program code and private or task-specific data; operating system resources that are allocated to the process, such as file descriptors (Unix terminology) or handles (Windows terminology); security attributes, such as the process owner and the rules describing the access rights other processes/threads may obtain to the process (depending on their security context); and processor state, such as the content of registers, physical memory addresses, etc.

The system typically associates one or more threads with a process to execute code; thus the relationship between threads and processes is many to one. When a process runs, one or more of its threads is actively executing on a processor in the system. In most operating systems, many processes exist simultaneously on a computer, each one taking turns receiving processing time (in a time-slicing system) or running concurrently (in a multiprocessing system). For the most part, the operating system keeps processes isolated from one another. However, the operating system typically provides mechanisms for inter-process communication (for example, messaging functionality or shareable memory) to enable processes to interact.

A process can invoke the operating system to create a new process; the latter is often called a child process and the initiating process is sometimes referred to as its parent. A child process may be a replica of the parent process and may share some of its resources. A child process may inherit most of the attributes of its parent. In UNIX, a child process is created (using fork) as a copy of the parent. The child process can then overlay itself with a different program (using exec) as required. Each process may create many child processes but will have only one parent process, except for the very first process which has no parent. The first process, called init in UNIX, is started by the kernel at booting time and never terminates. In the NT operating system, the kernel creates a special system process during system initialization that provides an execution environment for system threads (threads that execute in the operating system's address space). Later in the system initialization process the system process creates a user-mode process known as the session manager (SMSS) in order to complete the user-mode initialization of the system. NT supports the notion of address space duplication in which certain portions of the parent's address space are cloned for a child process. Handles to system resources may optionally be propagated to a child process if they are marked "inheritable" and the parent process indicates that it desires such inheritance. Alternatively, an entirely new process may be created without the need for the intermediary fork( ) step used in UNIX.

The operating system typically associates some form of security with a process. In a multi-user operating system, this is necessary in order to prevent one user from accessing or modifying the state of another users' process. Without this security a malicious user could take control of another user's process and steal valuable data such as a password stored in the process address space. In NT the default security context for a process is implicitly inherited from the creating process or is explicitly supplied to the operating system by the creating process. This context typically reflects the user the process is executing on behalf of, and governs the access the process can have to various system resources, including other processes. The system also associates a security descriptor with the newly created process object that delineates the access rights other users can obtain to the object. Note that the creator is marked as the owner of the new object, which ensures that the creator can obtain full access to the new process. However, if run by certain users, any process can access the state of another process or inject threads of execution into another process. In most traditional operating systems, the system administrator is capable of accomplishing this. NT expands upon this basic security model by adding the notion of privileges that bypass the standard user/group based protections. For example, a user granted the debug privilege by an administrator will also have unrestricted access to any process running on the system. Unfortunately this security model poses some difficulty for the wave of emerging digital rights management (DRM) technologies. DRM technologies fundamentally require the ability to operate on "protected content" within a process whilst preventing the user (the creator) from recovering a hidden key or secret used to decode the content, or subvert the terms of a license associated with the content. Though capturing any decoded content from a DRM process (and distributing it outside the context of the DRM process) is a concern, it is the content key that is typically the most valued asset. Once recovered, it empowers a malicious user to decrypt or subvert the terms of a license surrounding any protected content. Fundamentally the DRM problem is difficult to completely solve since the secret typically must reside somewhere on the client machine, and furthermore, must be processed by the DRM process during the course of accessing protected content. A certain degree of protection for the secrets and content in a DRM process can be provided if the operating system implemented a mechanism to execute a process and shield it from certain known invasive operations performed by another process, regardless of the latter's security context or privilege level.

SUMMARY OF THE INVENTION

An operating system such as the NT operating system provides a mechanism for creating a secure process that prohibits any known form of intrusion from a non-secure user-mode process, including thread/code injection, address space access (read, write, or modify), and debugging, regardless of the latter's security context or privilege level. This protection is extended to any thread objects that may be executing within the address space of a secure process. In NT, user mode processes can only access system resources and objects (including other threads and processes) by means of a handle. Each handle caches with it the access rights granted to the process holding the handle. When a handle is created, the system verifies the calling process possesses the appropriate access rights by inspecting the security context associated with the requesting process. Secure process technology adds a layer on top of the existing system security mechanism by vetoing any attempt to create a handle to a secure process (or to a thread in a secure process) with an access mask that grants any subset of the invasive access rights outlined in the table below. This restriction is enforced regardless of whether or not the access would have been granted given the requesting process' security context, as long as the requesting process is not a secure process.

sidered safe, barring the few instances noted above. All other access rights are considered unsafe and any attempt to acquire them when accessing a secure object will result in a denial of access. Note that in the case of the italicized access rights, the system will grant the indicated access right at the time a handle to a secure object is created. However, the operating system may selectively fail individual operations performed with these access rights, in accordance with the table above. The semantics associated with the individual access rights themselves in the table above are fairly self explanatory, save for the PROCESS_SET_INFORMATION, PROCESS_QUERY_INFORMATION, THREAD_SET_INFORMATION, and THREAD_QUERY_INFORMATION access rights, all of which cover a relatively broad range of functionality. These access rights enable the caller to query or set various attributes of the process and/or thread. For example, one can open the debug port, change priority levels, set the primary token, or query the quota information associated with a process with either the PROCESS_SET_INFORMATION or PROCESS_QUERY_INFORMATION access rights (as appropriate). A caller can likewise set priority levels, set processor affinity, open the current impersonation token, or query running time information associated with thread objects if the caller possesses the appropriate set and query access rights.

The full secure process access check algorithm is outlined below:

| Process Access Rights | | Thread Access Rights | |
|---|---|---|---|
| PROCESS_TERMINATE | | THREAD_TERMINATE | |
| PROCESS_CREATE_THREAD | | THREAD_SUSPEND_RESUME | |
| PROCESS_SET_SESSIONID | | THREAD_ALERT | |
| PROCESS_VM_OPERATION | | THREAD_GET_CONTEXT | |
| PROCESS_VM_READ | | THREAD_SET_CONTEXT | |
| PROCESS_VM_WRITE | | THREAD_QUERY_INFORMATION | Token open |
| PROCESS_DUP_HANDLE | | THREAD_SET_INFORMATION | Hide from debugger Alignment fault fixup Break on termination |
| PROCESS_CREATE_PROCESS | | THREAD_SET_THREAD_TOKEN | |
| PROCESS_SET_QUOTA | | THREAD_IMPERSONATE | |
| PROCESS_SET_INFORMATION | | THREAD_DIRECT_IMPERSONATION | |
| PROCESS_QUERY_INFORMATION | Token open Profiling Debug port open Debugging | SYNCHRONIZE | |
| PROCESS_SET_PORT/ | | STANDARD_RIGHTS_REQUIRED | |
| PROCESS_SUSPEND_RESUME | | | |
| SYNCHRONIZE | | | |
| STANDARD_RIGHTS_REQUIRED | | | |

The table above lists the fill set of access rights available to process and thread objects as of the current revision of the NT operating system. STANDARD_RIGHTS_REQUIRED is a set of access rights associated with all objects in the operating system and includes the DELETE, WRITE_DAC, WRITE_OWNER, and READ_CONTROL access rights. In the preceding table, WRITE_DAC, WRITE_OWNER, and READ_CONTROL access rights. In the preceding table, bold entries indicate access rights that are considered "safe" against secure objects. Those entries in italics are also con-

| Requesting Process | Target Process | Access Check Algorithm |
|---|---|---|
| Non-secure Process | Non-secure Process | If AllowedAccess (RSC, TSD) Then Grant handle Else Deny access |
| Non-secure Process | Secure Process | If AllowedAccess (RSC, TSD) and IsSubset (RA, |

-continued

| Requesting Process | Target Process | Access Check Algorithm |
|---|---|---|
| | | SafeAccess) then Grant handle else Deny access |
| Secure Process | Non-secure Process | If AllowedAccess (RSC, TSD) then Grant handle else Deny access |
| Secure Process | Secure Process | Not specifed |

Key
AllowedAccess - System security validation procedure
RSC - Requesting process' security context (including any special privileges)
TSD - Security descriptor defining access to the target object
RA - Requested access to the target process object
SafeAccess - Set of access rights to a process considered to be non-invasive (i.e., "safe")
IsSubset - Determines if one argument is a subset of the other It will be appreciated that by "requesting process" is meant the process in which the requesting thread is executing. With respect to "target process", it will be appreciated that the same restrictions would apply to a secure thread object. Any thread executing within a secure process is considered a secure thread. Note that the preceding two tables also dictate the access rights the process that creates a secure process will be able to obtain. To determine the granted access, note that RA is effectively the complete set of defined accesses and the AllowedAccess check will always succeed in the algorithm above (since the creator is considered the owner of a new process and or thread object. The only modification to the algorithm is that rather than denying access if a violation is detected, a handle with partial access (as defined by the table above) is granted to the creator.

In the preceding table there is no stipulation regarding the access rights secure processes can have to each other. In NT the current implementation allows secure processes to access each other purely on the basis of security context (as in the first row of the table); alternatively, the security policy in the second row of the table could have been employed to ensure secure processes remain isolated from one another. Also, note that the default access check algorithm (defined in the first row) is applied only if the requesting process invokes the operating system while running in user mode. If the process requests access from within the operating system (i.e., from kernel mode), the access is unconditionally granted as the kernel is considered a trusted component.

A major component of accomplishing this goal involved ensuring process creation now occurs "atomically" in kernel mode. This marks a departure from the historical NT process creation model in which a process was created using a sequence of incremental calls between the creating process and the operating system. Creating the infrastructure of a process in kernel mode enables security features to be applied that are difficult or impossible to apply in user mode. By moving setup actions previously occurring in user mode (such as creating the initial thread object, initializing the thread's machine context, allocating the stack, and creation and initialization of the process parameter and environment blocks) into kernel mode, it is possible to remove the calling process' need to possess certain access rights to the child process. Since enough state is passed from the caller to the kernel with the first system call, the kernel can construct a complete executable process and simply return handles to the new process and associated thread that grant only a limited set of access rights (as defined in the preceding table).

The entire process creation function is moved to a trusted context and requires a single system call. The trusted context may be the kernel. Moving process creation into kernel mode provides an isolated, shielded and protected context. Using this architecture markedly reduces the number of system calls and context switches involved in process setup as well. The behavior of the process creation function, in accordance with some embodiments of the invention, is parameterized. The parameterization may be implemented via a number of attributes. For example, one of the attributes may be the image file name. The image file name may be captured by the kernel and may be used to open the image file, and may additionally force an access check if the previous mode of the caller is user. In some embodiments of the invention, the creator requests that the new process be created a secure process via another parameter. At the time the operating system creates a memory backing object for the process (in NT, called a image section object), it verifies that the executable may be run as a secure process using a OS-defined mechanism (in NT, this is done by performing a signature check on the executable binary) before marking the new process object as a secure process.

Parameters may be communicated to the kernel via a variable length list of attributes. The attribute in some embodiments is identified by a packed field bitfield that uniquely identifies the attribute, marks it an input or input/output and indicates whether the data value is communicated inline (e.g., as with handles) or out of band (e.g., via a pointer to data located elsewhere in memory). The kernel accesses and captures the attribute list during the process of building a process or a thread object. Thus the attribute list may be used to specify various properties of a thread in a single system call that previously may have been set by numerous system calls following the thread or process object creation. Using an extensible parameterized API for process and thread creation allows additional parameters to be added in future revisions of the OS without introducing additional system interfaces.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 1:
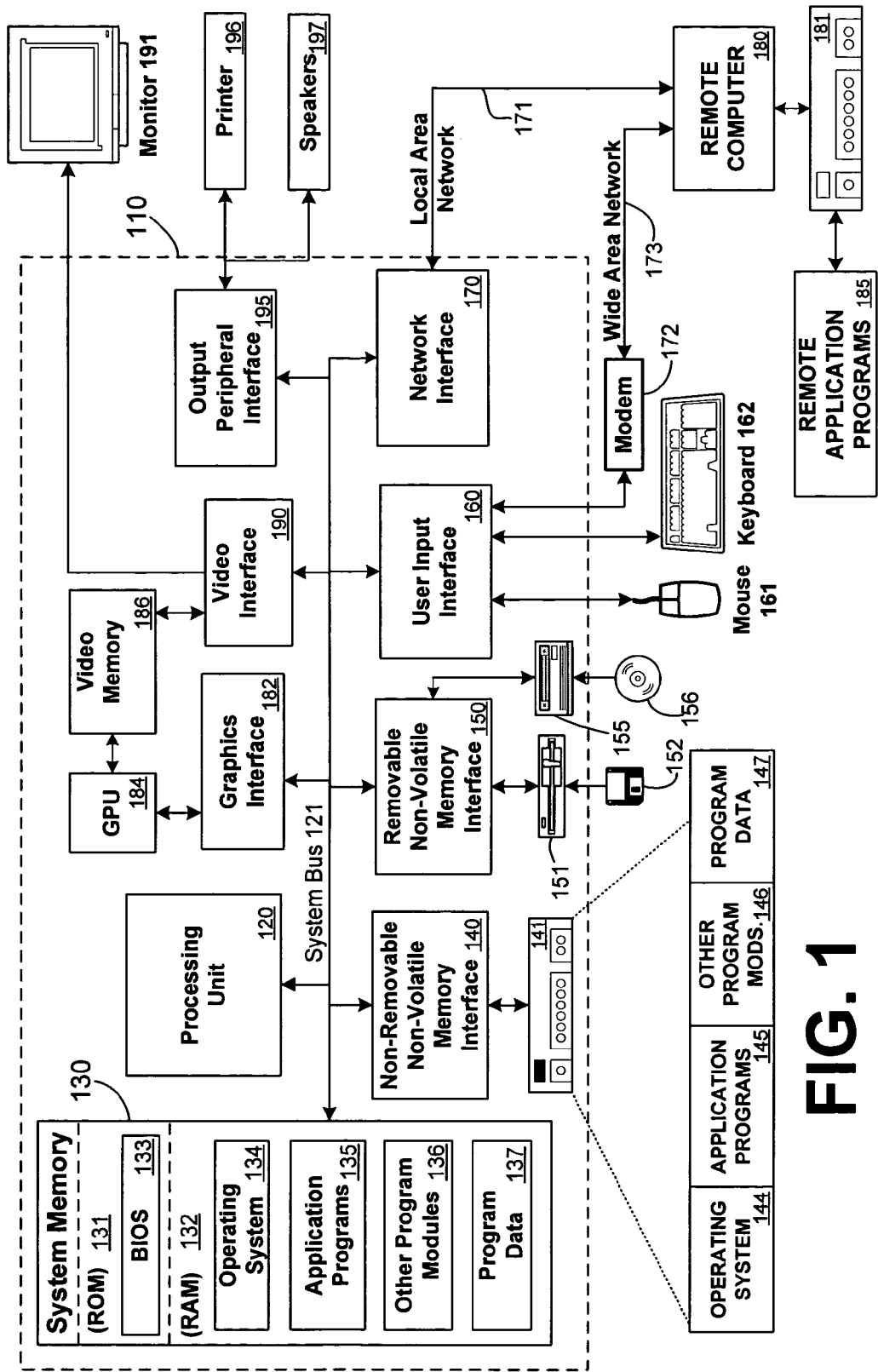
FIG. 1 is a block diagram showing an exemplary computing environment in which aspects of the invention may be implemented.

A process may be an operating system object that is used to track and manage a program while it is executing. A process may be viewed as a container for an address space and a set of resources (e.g., a handle table and so on, used when executing an instance of a program), to which executable units (threads) are added. A process comprises a private virtual address space, (a set of virtual memory addresses that the process can use), an executable form of a program, which defines initial code and data and is mapped into the process's virtual address space, a list of open handles to various system resources, such as semaphores, communication ports and files that are accessible to all threads in the process, a security context called an access token that identifies the user, security groups and privileges associated with the process, a unique identifier called a process ID (internally called a client ID) and zero or more threads of execution.

In some existing computer systems, there are two possible modes of execution: kernel mode and user mode. User application code runs in user mode; operating system code (such as system services and device drivers) runs in kernel mode. In kernel mode, access is granted to all system memory and all CPU instructions. User applications explicitly switch from user mode to kernel mode when a system service call is made or trap instruction is invoked; an implicit switch occurs in the case of exceptions (such as a page fault) and hardware interrupts.

If run by a user with appropriate privileges, a process can perform various operations on other processes in the system, including accessing the address space of another process, duplicating handles into and out of the process' handle table, injecting threads, and attaching a debug port to it. The ability for one process to access the state of another process in this manner effectively enables a process to gain full control of another process. In some systems the majority of a new process' infrastructure is constructed by the creator via a series of calls to the operating system. This requires, among others, the permission to read/write virtual memory and to create threads in the new process. Thus, even a user with no special privileges can take advantage of this window of opportunity to access the state of a process the user creates—a process that may contain protected content.

Consider, for example, the following scenario. Most music available legally on the Internet requires a user to have a license to download and play music. The license is required in order for the music player program to decrypt and play music. A user could log on to the system, pay for and download a song from the Internet, and start an application that was written to extract protected content from the process that plays the downloaded decrypted music file. Since the user is the owner of the music player application, the application for extracting content can inject threads or access the state of the audio playback process to copy the audio stream into an unprotected file. Such an application may also be written to access the trusted keys used in the decryption and policy/license enforcement process. Removing the ability of the owner to obtain full access to the process only serves as a partial mitigation since the administrator can typically always obtain the desired access (either directly or by using special privileges). This is an important scenario as the end user is typically an administrator on a home machine.

To address these and other problems, a secure process can be created, for example, for applications that need to protect content. A secure process in some embodiments cannot be manipulated, even by processes created on behalf of a user with administrator or other heightened privileges, through any user-mode means. The mechanism to create the isolated process object constructs all the required process infrastructure from within the kernel, obviating the need for the creating process to have unrestricted access to the new process. Additional checks in the kernel prevent a process from obtaining unauthorized access to a secure process, regardless of the former's security context.

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Creating a Secure Process

Microkernel-based operating systems developed from university research in the mid-1980s. The idea behind the pure microkernel concept is that all operating system components except a small core (the microkernel) execute as user-mode processes, just as word processors and spreadsheets do. The core components in the microkernel of a microkernel-based operating system execute in privileged mode, and can directly access hardware. Microkernel architecture typically confers system configurability and fault tolerance. For example, because an operating system subsystem like the virtual memory manager runs as a distinct program in microkernel design, a different implementation that exports the same interface can replace it.

A disadvantage to pure microkernel design is slow performance. Every interaction between operating system components in microkernel design requires an inter-process message. For example, if the process manager requires the virtual memory manager to create an address map for a new process, it must send a message to the virtual memory manager. In addition to the overhead costs of creating and sending messages, the inter-process message requirement results in two context switches: the first from the process manager to the virtual memory manager, and the second back to the process manager after the virtual memory manager carries out the request.

Figure 2:
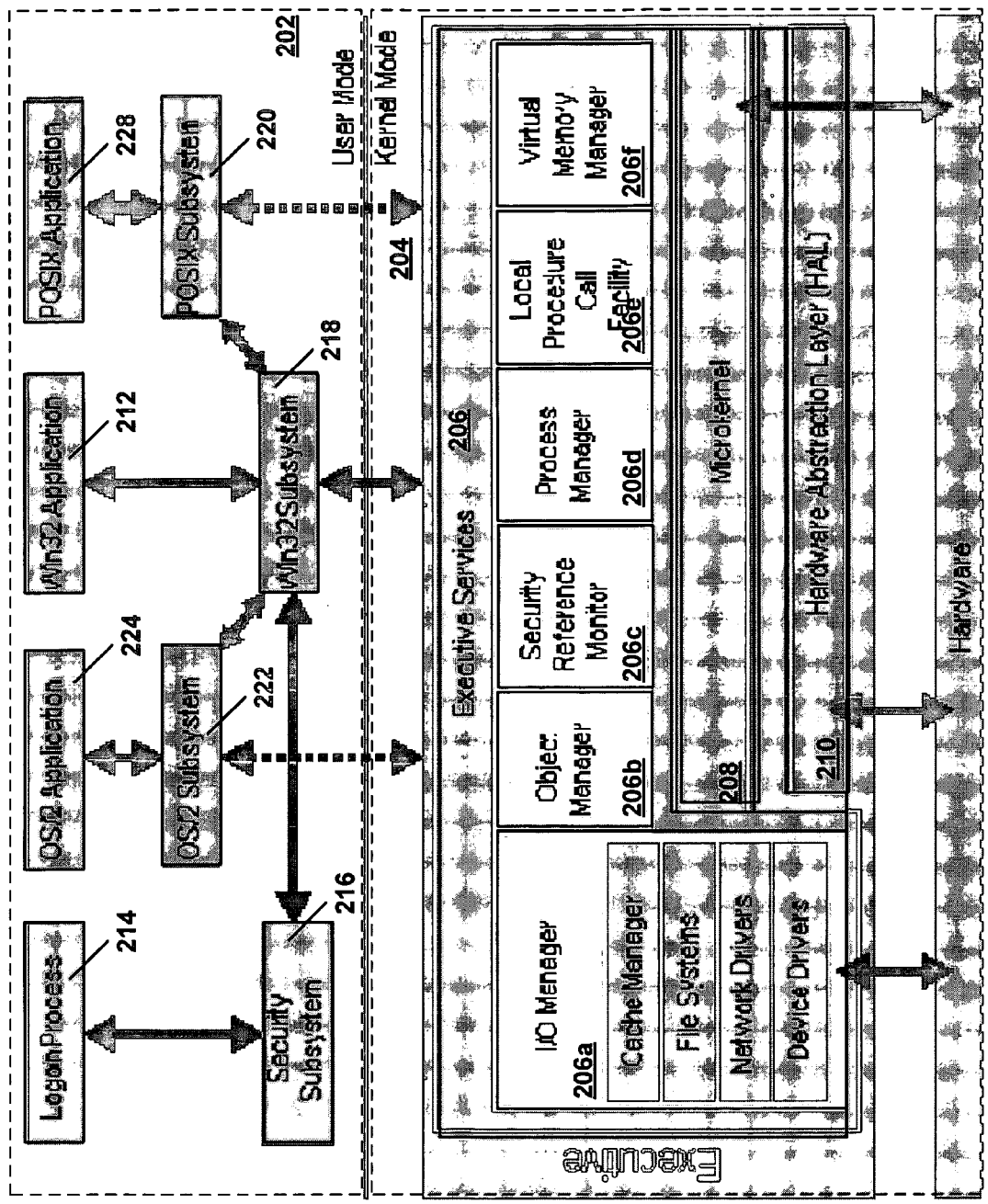
FIG. 2 is a block diagram illustrating an operating system configuration for creating secure process objects in accordance with one embodiment of the invention.

In a modified microkernel design, (illustrated in FIG. 2) an operating system environment executes in user mode 202 as discrete processes but many of the operating system components are combined into a single image. Exemplary user mode 202 is made up of system processes such as the logon process 214 and the security subsystem 216, applications subsystems (e.g., made up of Win32 218, Posix 220, and OS/2 222 subsystems) along with whatever applications are run (e.g., OS2 applications 224, Win32 applications 212, and POSIX applications 228. Posix 228 and OS/2 224 run on their respective subsystems, while Win32, Win16 and DOS applications run on the Win32 subsystem 218.) User mode applications such as Win32, OS/2, Win16, DOS or Posix applications all run in their own memory space, protected from each other, and separate from the operating system running in kernel mode. User mode is the least-privileged mode supported. It has no direct access to hardware and has only restricted access to memory. When programs execute in user mode, the programs are confined to "sandboxes" with well-defined restrictions. The programs do not have direct access to hardware devices, and cannot access or modify parts of memory not specifically assigned to them.

The kernel may include three major components: executive services 206, the microkernel 208 and the hardware abstraction layer 210. Executive services 206 is the interface between each of the user mode subsystems and the microkernel 208 and may include hardware device drivers, an I/O manager 206a, object manager 206b, security reference monitor 206c, a process manager 206d, a local procedure call facility 206e, a virtual memory manager 206f and others. The microkernel 208 synchronizes the executive services 206, implements a thread scheduler, and coordinates I/O functions. The hardware abstraction layer 210 is an interface between and the operating system and the underlying hardware.

The executive services 206 are basic operating system subsystems that execute in kernel mode and are compiled into one file image. Kernel mode is a privileged mode. Those parts of the system that execute in kernel mode, such as device drivers and some subsystems or subcomponents have direct access to all hardware and memory. The kernel-mode subsystems are not separate processes, so they can communicate with one another by using function calls, which tends to improve performance. Often these types of operating system environments rely on services that the kernel mode exports to carry out tasks that cannot be carried out in user mode. Code executing in user-mode typically gains access to these services through software-exception system calls. A software-exception system call is a hardware-assisted way to change execution modes from user mode to kernel mode; and gives the operating system control over the data that passes between the two modes.

Hence, a system service request is executed by a function in kernel mode. To carry out work, a system service calls on functions in one or more components of the executive services 206. Thus, when an application or program 212 like a word processing program requests an operating system service such as memory allocation, the flow of control proceeds from the word processing program into kernel mode through the system service interface. A system service handler then directly invokes the Virtual Memory Manager's allocation function. The operation executes in the context of the word processing process that requested it. Thus, there is no context switch to a different system process as typically exists in a pure microkernel-based operating system.

Figure 3A:
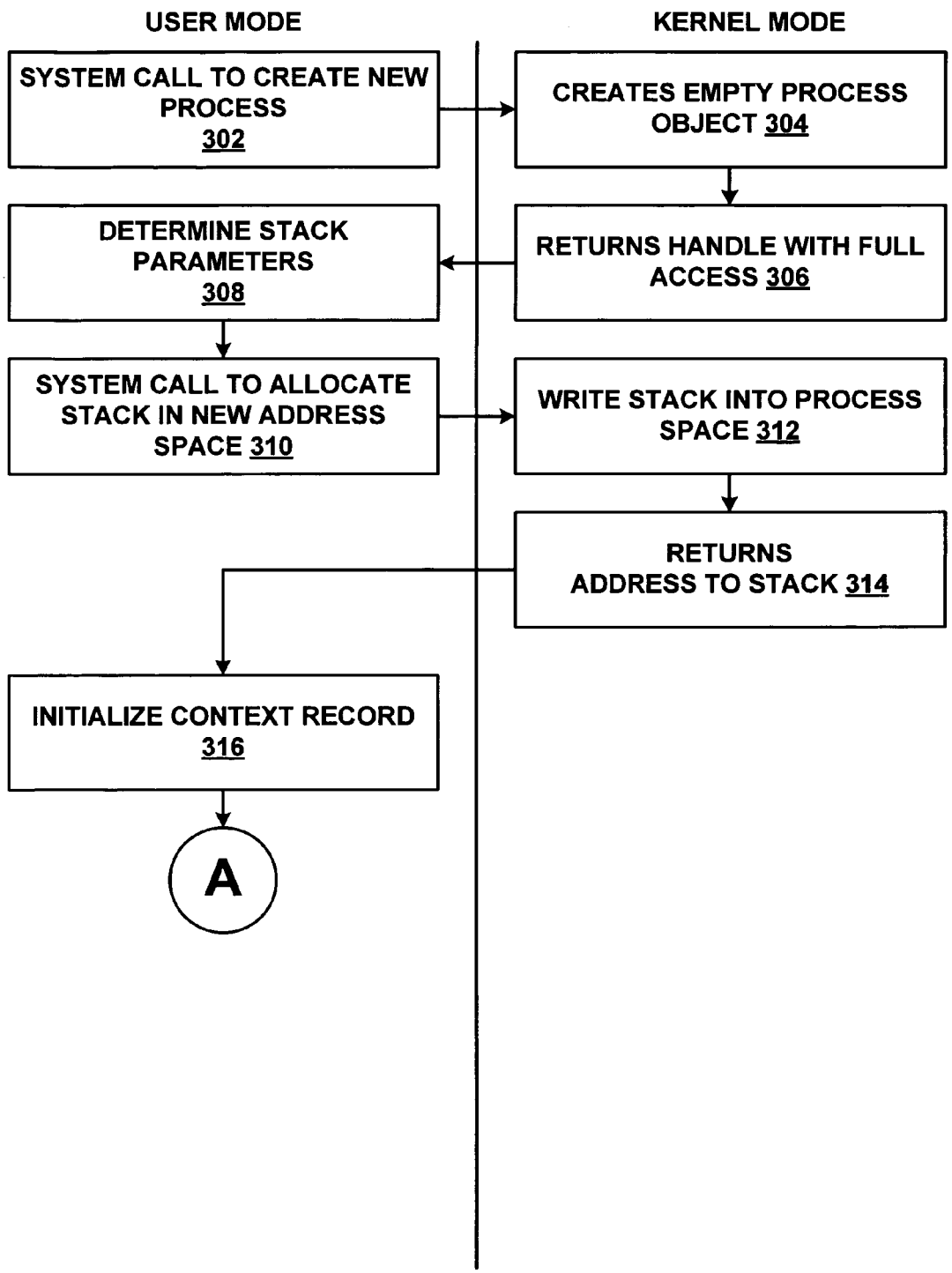
FIGS. 3a-3b comprise a representative flow diagram of a method for creating a new process.
Figure 3B:
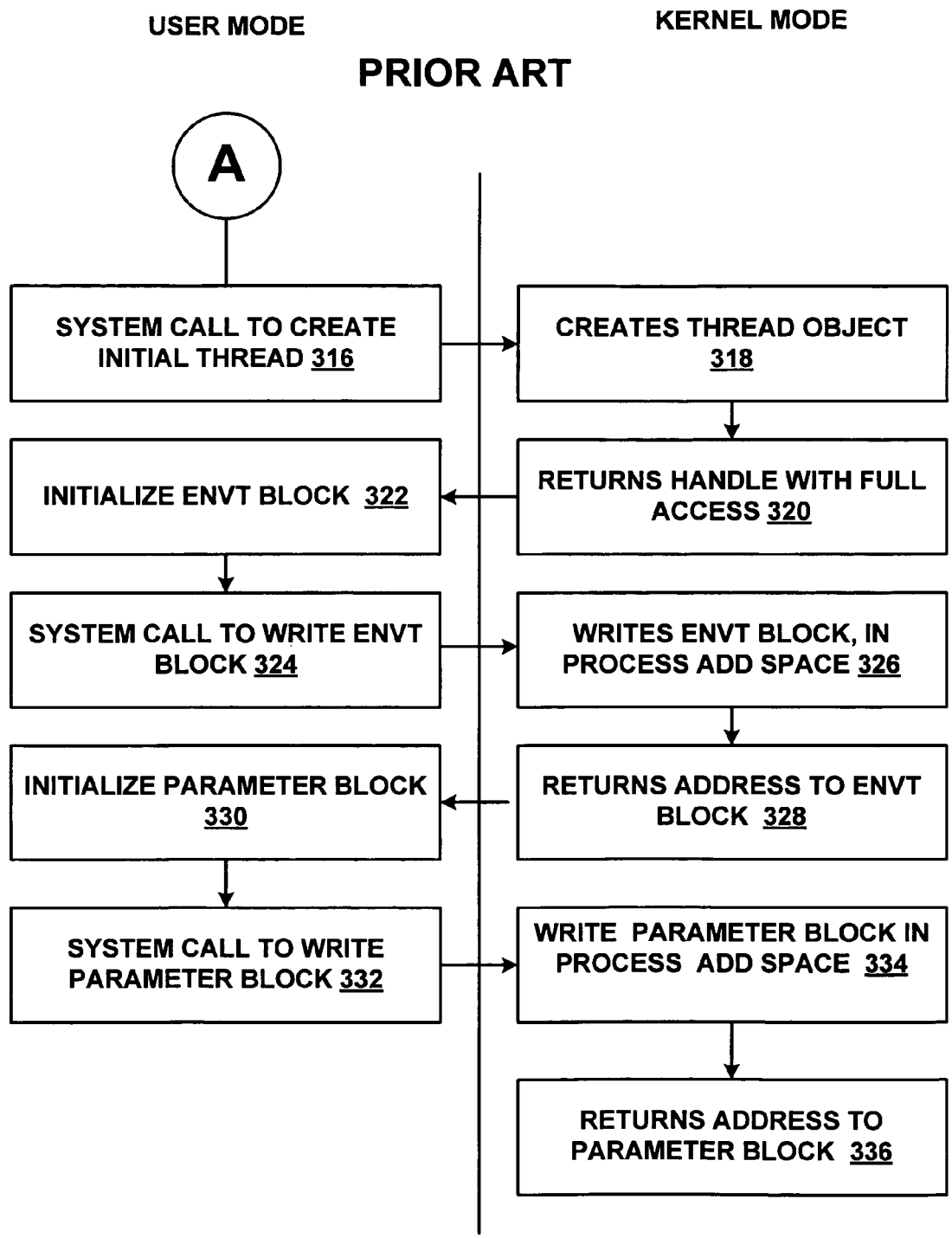

Traditionally, a parent process typically is allowed to acquire a handle to and manipulate the state of any child process it creates. FIG. 3 is a flow diagram of a known method of spawning a new process. Creation of a new process traditionally is a multi-step process requiring a user-mode application to make a number of system calls, thereby switching back and forth from user mode to kernel mode. At 302, a caller in user mode makes a system call (a call to the operating system) requesting the creation of a new process (i.e., by calling a process creation function). At 304 the kernel (in kernel mode) receives the call, opens an executable file and creates an image section object to map the executable file into the new process address space. The kernel then creates an empty process object. Creating the process object typically comprises a number of tasks, including creating the process's primary access token. The new process s primary access token is typically a duplicate of the parent process's primary token, so that a new process inherits the security profile of its parent. In other cases the creator may explicitly supply the primary token to use. Other process creation tasks include: initializing the process handle table, creating the initial process address space, initializing the kernel process block (which includes a pointer to a list of kernel threads), initializing the working set list and virtual address space descriptors, mapping the image into the address space and setting up the process environment block. The kernel returns a handle to the new process (granting full access) to the caller at 306. To create a thread stack, the maximum size for the stack and the committed size is determined (308). The stack size for the initial thread is typically taken from the image. At 310 the caller executes another system call, requesting the kernel to allocate the stack into the new address space of the process object. At 312, the kernel (in kernel mode) allocates the stack in the new process' address space and at 314, returns the address of the stack. At 316 in user mode the caller initializes a new machine context record for thread; the record is updated to reflect the new thread's entry point, initial parameter, and user-mode stack and the caller makes another system call asking the kernel to create the initial thread. At 318, the initial thread is created by the kernel in kernel mode. At 320, the kernel returns the handle to the thread object to the caller (granting full access to the thread). At 322, in user mode the caller initializes the environment block. At 324 a system call is made requesting the writing of this state into the new process' address space. At 326 in kernel mode, the kernel writes the environment block values into the process' address space. At 328 the kernel returns an address to the environment block to the caller. At 330, in user mode the caller initializes state for the parameter block (which contains additional process information such as the current directory). At 332 a system call is made requesting the writing of this state into the new process' address space. At 334 in kernel mode, the kernel writes the environment block values into the process' address space. At 336 the kernel returns an address to the environment block to the caller. The creating process then notifies the relevant subsystem process that a new process has been created. This enables the subsystem process to set up any internal state needed to manage the new process. At this point the process environment has been determined and resources for the thread to use have been allocated, the process has a thread and the managing subsystem 206*d* knows about the new process. The initial thread may now be resumed so that it can begin executing and perform the remainder of the process initialization that occurs in the context of the new process. The new thread begins running the kernel mode thread startup routine before exiting to user-mode and executing user-mode code.

It will be apparent to one of skill in the art that the method of creating a process just described requires the creator of a process to have powerful access privileges (including read/write virtual memory and thread creation) to the target process in order for the process creation to succeed. Thus, traditionally, the caller of the process and thread executive system service is granted full access to the created process and/or thread objects. It will be appreciated that the access so granted is typically independent of other security features of the system. For example, access to objects may be determined by the type of access granted to the caller in the process and thread security descriptor. A security descriptor is a binary data structure that contains information related to access control for a specific object. A security descriptor may contain the following information: the owner of the object, the primary group of the object, the discretionary access control list, the system access control list and control information. The owner may be a user, group or computer account. Typically, the owner of an object can manipulate the object's access control list regardless of any other settings in the system descriptor.

Similarly, a user with sufficient privileges, (e.g., an administrator or any type of account (general, administrator or guest account) with debug privileges) is able to access and manipulate the state of all processes on the system. Hence a malicious user with administrator privileges could: inject a thread into another process, inspect the state of another process, or otherwise modify state in another process.

To prevent these undesirable artifacts of the process creation function, in accordance with some embodiments of the invention, a secure process may be created which does not allow code injection into the isolated process, or general memory modification of processes or inspection of processes once it has been created. A creator process is not necessarily provided with sufficient access rights to build the new process' infrastructure (the access will be determined by the access check algorithm above). The resources protected in a secure process include all the internal state and threads running in the secure process. In some embodiments of the invention, a non-secure process (user-mode process) can create a secure process by calling a system service and passing to the function a secure process flag. Once a secure process is created, the secure process is protected from access by non-secure processes.

As described above, and illustrated in FIG. 3, a parent process running in user mode traditionally has full access to a child process created by the parent because the infrastructure for the child process is largely built from the user mode context. In order to create a process object and a thread object, to create the user-mode stack and so on, the creator of the child process requires access to the new process' virtual memory and the ability to create a thread in the new process. Consequently, once the child process is running, these access rights persist, enabling the parent process to inject additional code or capture data out of the process.

In contrast, in accordance with some embodiments of the invention, process creation occurs entirely in kernel mode. Creating the infrastructure of a process in kernel mode enables security features to be applied that are difficult or impossible to apply in user mode. By moving setup actions previously occurring in user mode (such as creating the initial thread, allocating the stack, and initialization of the parameter and environment blocks) into kernel mode, the need of the caller for full access rights to the created process is removed. Instead, enough state is passed from the caller to the kernel with the first system call so that the kernel is able to perform the actions previously performed using a number of calls back and forth between the caller and the kernel. Thus, when the kernel returns the handle to the set-up process, some of the access rights accompanying the handle are not returned. Specifically, those access rights (e.g., read/write virtual memory) that enable the caller to inject threads, and interrogate or modify state of the threads of the process may not be returned to the caller.

In accordance with some embodiments of the invention, the entire process creation function is moved to a trusted context and requires a single system call. In some embodiments of the invention, the trusted context is the kernel, as described above and illustrated with respect to FIG. 2. Moving process creation into kernel mode provides an isolated, shielded and protected context, thereby markedly reducing the number of system calls and context switches involved in a process setup. In some embodiments of the invention, a process is identified and marked as a secure process at the time the image section object for the process is created. This decision is typically made if the creator is requesting the creation of a secure process and the system successfully performs some sort of validation on the executable image file. The behavior of the process creation function, in accordance with some embodiments of the invention, is parameterized. The parameterization may be implemented via a number of attributes. For example, one of the attributes may be the image file name. The image file name may be captured by the kernel and may be used to open the image file, and may subsequently force an access check if the previous mode of the caller is user mode.

Parameters may be communicated to the kernel via a variable length list of attributes. The attribute field in some embodiments is a packed field bitfield that uniquely identifies the attribute, marks it an input or input/output and indicates whether the data value is communicated inline (e.g., as with handles) or out of band (e.g., via a pointer to a data object). The kernel accesses and captures the attribute list during the process of building a process or thread object. Thus the attribute list may be used to specify various properties of a thread in a single system call that previously were set by numerous system calls before the thread began execution.

To prevent the need for a series of system calls that read/write the parameter and environment blocks from/to the address space of the new process, the parameter and environment blocks are passed as an argument to the create process function. Both the parameter and environment blocks may be captured into a contiguous block of memory in the kernel (for performance, this memory is typically nonpageable). A region in the address space of the new process is allocated to accommodate the parameter/environment block. When the process executes the user-mode startup code, it copies the parameter and environment blocks to separate allocations and relinquishes the kernel-allocated memory space.

In accordance with some embodiments of the invention, a secure process is created that grants non-secure process some subset of the full access mask. In some embodiments of the invention, the access mask is a 32-bit mask. Subsequent attempts to open the identified process or a thread belonging to a secure process with an access mask that is a superset of the pre-defined set (defined earlier) are caught and obstructed in kernel mode, thus protecting the secure process from interference by any user-mode process.

The access mask used to open the file may be augmented by a caller-supplied parameter. The additional access mask is required as user mode process creation interceptors require an expanded access set to perform operations such as mapping a data view of the file for computing checksums. Performing the initial open with the proper access mask obviates the need for additional access checks at the time the handle is duplicated to the caller. The creation of the image section is performed in kernel mode. Regardless of whether the process creation succeeds or fails, the system maintains creation information that describes the outcome of the process creation. For example, this creation information may record the result of various process creation failures, along with additional data, such as object handles, enabling the caller to react accordingly. This could include re-launching the process under a debugger if the kernel detects an image file execution option for the executable that specifies the "Debugger" option; in this case, the creation information would include a handle to the image file execution options key object such that the caller could query the path of the debugger executable.

Figure 4:
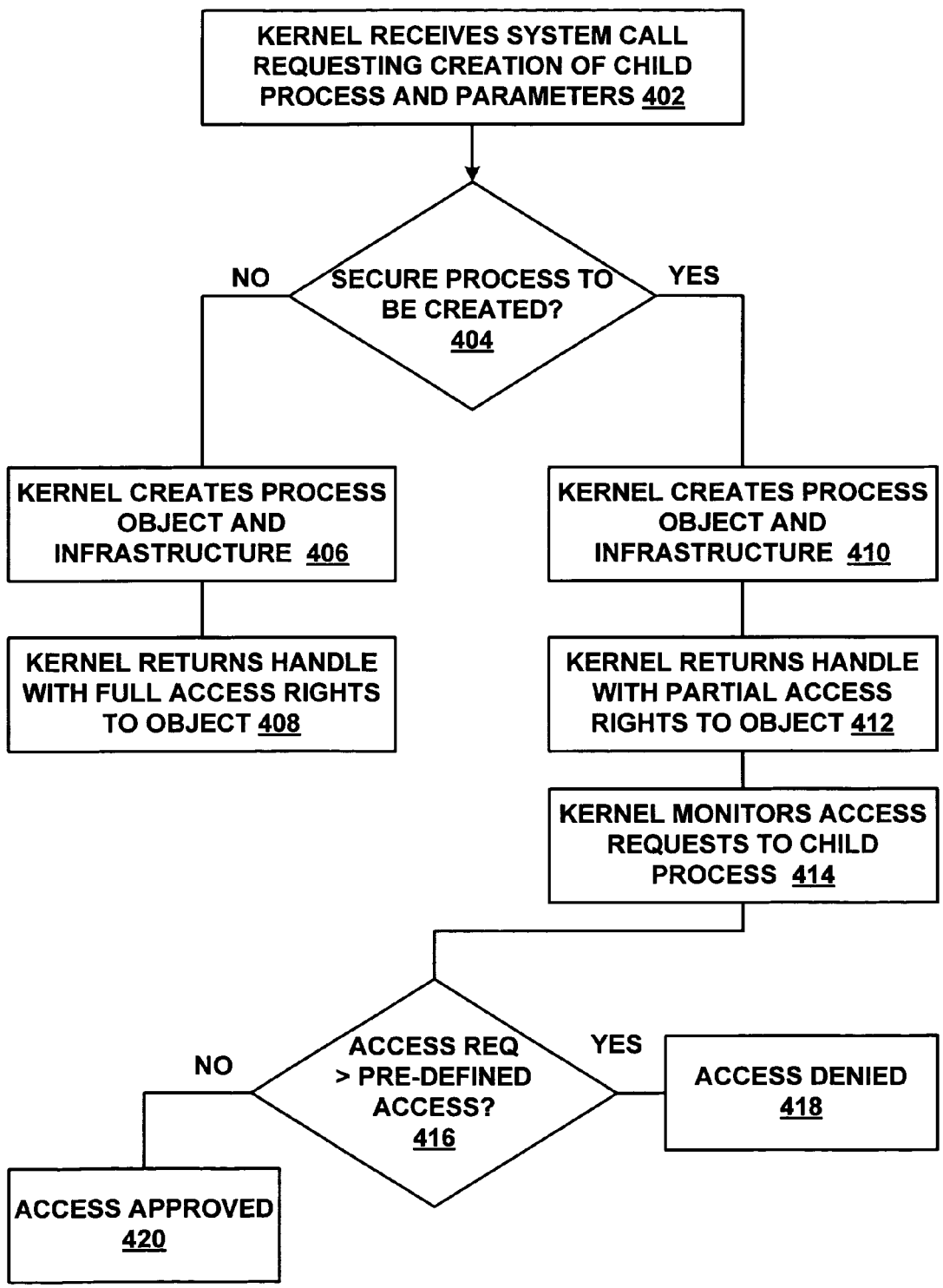
FIG. 4 is a flow diagram of an exemplary method for creating an isolated process in accordance with one embodiment of the invention.

FIG. 4 is a flow diagram of an exemplary method for creating a process in kernel mode in accordance with one embodiment of the invention. At 402 a single system call is received by the kernel requesting the creation of a process. With the system call is sent a set of parameters specifying the values required for the creation of a stack and thread, and initialization of the parameter block, environment block, and context record. Parameters sent to the kernel may include one or more of the following: the parent process, a debug object to attach to the created process, the primary token used to enable the process creation, a variable to receive the created process ID or thread ID, the variable to receive the address of the thread's environment block, the name of the file to be opened and used to create the image section, output information describing the image section of the process, an array of memory regions to reserve in the created process' address space before it begins execution, the priority class to set on the created process, and whether the parent process' standard handles should ever be duplicated the child and if so the conditions under which the duplication should be performed. The system call may also be accompanied by a flag which indicates if the process to be created is to be a secure process.

At 404 the kernel determines if the process to be created is a secure process. In some embodiments of the invention, a request flag is passed by the creating process. If this flag is set, the image section may be created using a secure image flag that triggers signature validation before the section is created. If signature validation is successful, a secure process is created. If the flag is not set the process will be created as a non-secure process. Note a process that only ever expects to run as a secure process must protect itself against being run as a non-secure process using additional methods (i.e., querying the OS to ensure that it is running as a secure process from within code that is protected via code obfuscation and/or anti-debugging technology). At 406 if a secure process is not to be created, the kernel creates the process object and infrastructure and at 408 returns a handle to the caller with full access rights. If a secure process is to be created, the kernel may set a secure process flag, create the process object and infrastructure in kernel mode at 410 and return a handle with only partial access rights to the object to the caller at 412. At 416, if the access requested is greater than a pre-defined access level, access is denied at 418. If the access requested is not greater than a pre-defined access level, access is permitted at 420. The set of allowed accesses are described in the access table presented earlier in the document.

Figure 6:
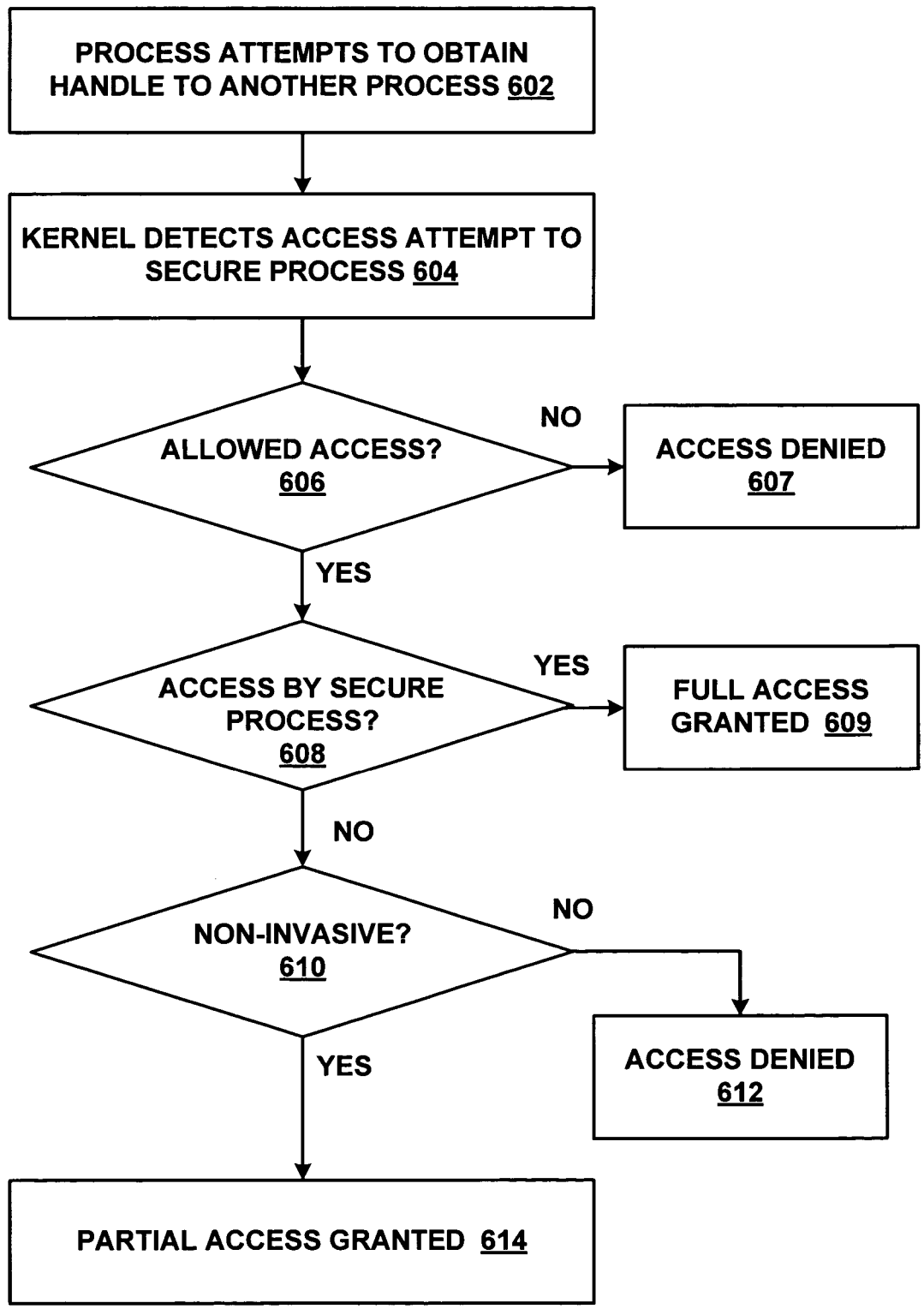
FIG. 6 is a more detailed flow diagram of a portion of the flow diagram of FIG. 4.

When a process attempts to obtain a handle to another process, the kernel monitors the access attempt. FIG. 6 illustrates an exemplary flow diagram of a process for determining whether access will be granted. At 602 a process attempts to obtain a handle to another process. At 604 the kernel detects an access attempt to a secure process. If the requesting process's security context is high enough (606), processing continues at 608. If not access is denied (607). At 608 the kernel determines whether the access attempt is being made by a non-secure process. If the access attempt is being made by a secure process, the requested access is granted at 609. If the access attempt is being made by a non-secure process, processing continues at 610. If the operation to be performed is considered to be safe (non-invasive) (610) the requested access is granted at 614. Otherwise access is denied at 612. It will be apparent to one skilled in the art that even those users with high access privileges such as administrators and user accounts such as general, guest or administrator accounts with debug privileges are not able to modify/interrogate the secure process and threads belonging to the secure process since the secure process access algorithm ensures that the secure process/thread checks take precedence over the standard access verification.

Figure 5:
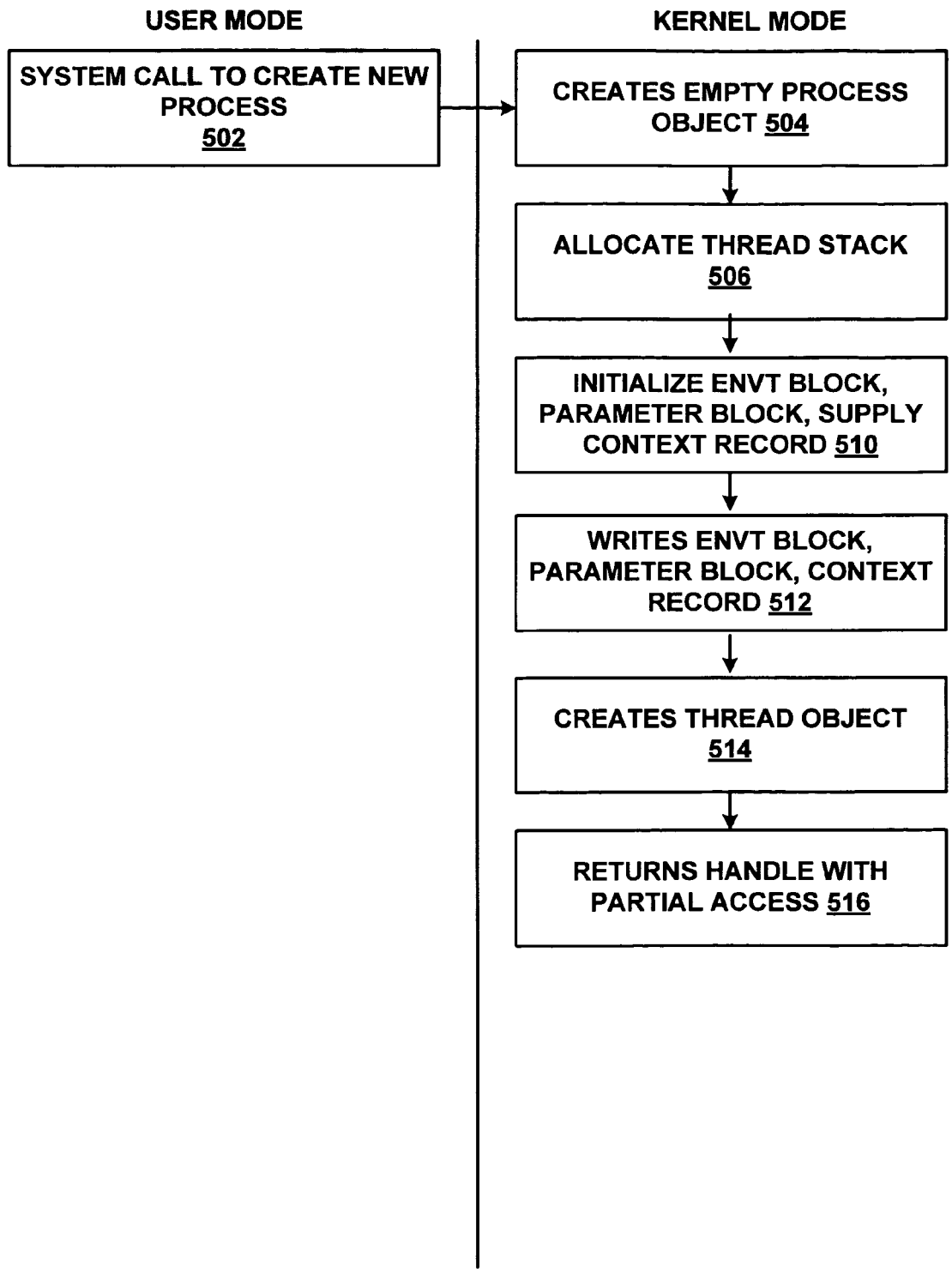
FIG. 5 is a more detailed flow diagram of a portion of the flow diagram of FIG. 4.

FIG. 5 illustrates a more detailed flow diagram of a portion of the flow diagram of FIG. 4. At 502 a caller in user mode makes a system call (a call to the operating system) requesting the creation of a new process (e.g., by calling a process creation function). At 504 the kernel (in kernel mode) receives the call, opens an executable file and creates an image section object to map the executable file into the new process address space. The kernel then creates an empty process object but does not return a handle to the process object to the caller at this time. Creating the process object typically comprises a number of tasks, including creating the process's primary access token. The new process's primary access token may not necessarily be a duplicate of the parent process's primary token, so that a new process may not inherit the security profile of its parent. Other process creation tasks include: initializing the process handle table, creating the initial process address space, initializing the kernel process block (which includes a pointer to a list of kernel threads), initializing the working set list and virtual address space descriptors, mapping the image into the address space and setting up the process environment block. To create a thread stack, the maximum size for the stack and the committed size is determined. The stack size for the initial thread is taken from the parameters or from the executable image header itself. The kernel at 506 allocates a thread stack (in kernel mode) for the new process. At 510 in kernel mode the kernel initializes state for the environment block, parameter block and the machine-dependent context record, using information received from the parameters accompanying the system call. At 512 in kernel mode, the kernel writes the environment block and parameter block into the new process' address space. At 514, the initial thread is created by the kernel in kernel mode using the previously allocated stack and context record. The kernel returns handles to the newly created process and thread objects with access as defined by the access table above 516. Note the creator is the owner and hence the standard security check succeeds; the actual access granted is the reduced set if the creator is a non secure process and the new process is a secure one, else the creator is granted full access. The creating process then notifies the relevant subsystem process that a new process has been created. This enables the subsystem process to set up any internal state needed to manage the new process. At this point the process environment has been determined and resources for the thread to use have been allocated, the process has a thread and the managing subsystem 206d knows about the new process. The initial thread may now be resumed so that it can begin executing and perform the remainder of the necessary process initialization in the context of the new process. The new thread begins running the kernel mode thread startup routine. It will be apparent to one of skill in the art the system architecture just described does not require the creator of a process to have the ability to create additional threads in the newly created process.

The process may be marked as a secure process (if the process being created is a secure process). A handle is returned to the process. The access rights returned with the handle are not necessarily full access rights (unless the creator is a secure process as well). The complete set of allowed access rights is delineated in the table in the preceding section. If a request is received attempting to open a secure process or a thread within a secure process, the request is intercepted. Regardless of the security credentials of the caller, access is limited to a subset of full access privileges as defined in the preceding table; note that this access set does not include the ability to create a thread or modify or interrogate the address space. The only entity that has full access to these protected processes is the kernel. That is, no process running in user mode is able to obtain full access to the secure process.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. An operating system implemented on a hardware computing device, the operating system configured to establish and maintain a secure process, the operating system comprising:

a user mode implemented on the hardware computing device; and a kernel mode implemented on the hardware computing device and configured to prohibit access by a non-secure user-mode process of the user mode to the secure process regardless of a security level of the non-secure user-mode process by:

receiving a single system call from a user-mode process at the kernel mode, the single system call comprising a request to create a child process in the kernel mode and a set of parameters associated with attributes to be applied to the created child process, wherein the child process is the secure process;

creating, by the kernel mode in response to the single system call, the child process within a trusted context, the creating including performing all actions needed to instantiate the child process in the kernel mode for the user-mode process in the user mode without receiving any further prompting from the user-mode process, including creating a handle to the created child process and a handle table associated with the handle, the handle table specifying a limited set of access rights prohibiting the user-mode process from accessing state of the created child process, the limited set of access rights being more restricted than a set of access rights already associated with the user-mode process, wherein the kernel mode enables access by the user-mode process to the secure process by providing the handle to the secure process to the user-mode process, wherein the handle is accompanied by a limited set of access rights to the secure process granted the user-mode process;

returning, by the kernel mode after creating the child process, the handle of the created child process to the calling user-mode process;

monitoring all access attempts to the created child process by non-secure user-mode processes in the user mode;

detecting an attempt to access the child process by any non-secure user-mode process; and denying the attempted access to the child process beyond the limited set of access rights of the handle table associated with the handle of the child process regardless of the set of access rights associated with the non-secure user-mode process.

2. The operating system of claim 1, wherein the secure process comprises at least one secure thread.

3. The operating system of claim 1, wherein the access comprises one of thread injection, code injection, debugging or access to an address space of the secure process.

4. The operating system of claim 3, wherein access to the address space comprises an ability to read, write or modify the address space.

5. The operating system of claim 1, wherein the kernel mode is further adapted to verify that a security context of the non-secure user-mode process is sufficient to access the secure process in accordance with a specified access mask.

6. The operating system of claim 1, wherein the kernel mode is further adapted to prohibit creation of the handle to the secure process, the handle associated with an access mask that grants a set of access rights comprising at least one of thread injection, code injection, debugging or access to an address space of the secure process, regardless of the security level of the user-mode process.

7. The operating system of claim 1, wherein the non-secure user-mode process executes under a user account comprising one of general, guest or administrator, or wherein the user account is associated with a debug privilege.

8. A method implemented in a computer hardware device having an operating system with a user mode and a kernel mode, the method implemented in the kernel mode for creating a secure process and comprising:

receiving a single system call from a user-mode process in the user mode at the kernel mode, the single system call comprising a request to create a child process in the kernel mode and a set of parameters associated with attributes to be applied to the created child process, wherein the child process is the secure process;

creating, by the kernel mode in response to the single system call, the child process within a trusted context, such creating including performing all actions needed to instantiate the child process in the kernel mode for the user-mode process in the user mode without receiving any further prompting from the user-mode process, including creating a handle to the created child process and a handle table associated with the handle, the handle table specifying a limited set of access rights prohibiting the user-mode process from accessing state of the created child process, the limited set of access rights being more restricted than a set of access rights already associated with the user-mode process, wherein the kernel mode enables access by the user-mode process to the secure process by providing the handle to the process to the user-mode process, wherein the handle is accompanied by a limited set of access rights to the secure process granted to the user-mode process;

returning, by the kernel mode after creating the child process, the handle of the created child process to the calling user-mode process;

monitoring all access attempts to the created child process by any non-secure user-mode processes in the user mode;

detecting an attempt to access the child process by a non-secure user-mode process; and denying the attempted access to the child process beyond the limited set of access rights of the handle table associated with the handle of the child process regardless of the set of access rights associated with the non-secure user-mode process.

9. The method of claim 8, wherein the limited set of access rights prohibits the creating user-mode process from injecting a thread into the child process.

10. The method of claim 8, wherein the limited set of access rights prohibits the creating user-mode process from injecting code into the child process.

11. The method of claim 8, wherein the limited set of access rights prohibits the creating user-mode process from debugging the child process.

12. The method of claim 8 wherein the trusted context is a kernel of an operating system.

13. A computer-readable hardware storage medium having stored thereon computer-executable instructions implementing a method in a computer hardware device having an operating system with a user mode and a kernel mode, the method implemented in the kernel mode for creating a secure process and comprising:

receiving a single system call from a user-mode process in the user mode at the kernel mode, the single system call comprising a request to create a child process in the kernel mode and a set of parameters associated with attributes to be applied to the created child process, wherein the child process is the secure process;

creating, by the kernel mode in response to the single system call, the child process within a trusted context, such creating including performing all actions needed to instantiate the child process in the kernel mode for the user-mode process in the user mode without receiving any further prompting from the user-mode process, including creating a handle to the created child process and a handle table associated with the handle, the handle table specifying a limited set of access rights prohibiting the user-mode process from accessing state of the created child process, the limited set of access rights being more restricted than a set of access rights already associated with the user-mode process, wherein the kernel mode enables access by the user-mode process to the secure process by the providing the handle to the secure process to the user-mode process, wherein the handle is accompanied by a limited set of access rights to the secure process granted to the user-mode process;

returning, by the kernel mode after creating the child process, the handle of the created child process to the calling user-mode process;

monitoring all access attempts to the created child process by non-secure user-mode processes in the user mode;

detecting an attempt to access the child process by any non-secure user-mode process; and denying the attempted access to the child process beyond the limited set of access rights of the handle table associated with the handle of the child process regardless of the set of access rights associated with the non-secure user-mode process.

14. The computer-readable medium of claim 13, comprising further computer-executable instructions for:
   prohibiting a request to access the child process from reading, writing, or modifying an address space of the child process, from injecting a thread into the child process, from injecting code into the child process or from debugging the child process, regardless of a security level of the request to access the child process.

15. The computer-readable medium of claim 13, comprising further computer-executable instructions for:
   in response to detecting an attempt to access the child process by any non-secure user-mode process, verifying that the non-secure user-mode process has sufficient privilege to access the child process by inspecting a security context of the non-secure user-mode process.

16. The computer-readable medium of claim 13, comprising further computer-executable instructions for:
   in response to detecting a set request flag in the single parameterized system call, triggering signature validation before creating an image section for the child process, wherein in response to successful signature validation, the child process is created as a secure process or wherein in response to failure to detect the set request flag, the child process is created as a non-secure process.

* * * * *

UNITED STATES PATENT AND TRADEMARK OFFICE
CERTIFICATE OF CORRECTION

PATENT NO. : 7,665,143 B2  
APPLICATION NO. : 11/129872  
DATED : February 16, 2010  
INVENTOR(S) : Darryl E. Havens et al.

Page 1 of 1

It is certified that error appears in the above-identified patent and that said Letters Patent is hereby corrected as shown below:

On the Title page, Item (57), under "Abstract" line 14, delete "fights" and insert -- rights --, therefor.

In column 19, line 4, in Claim 1, after "granted" insert -- to --.

In column 19, line 66, in Claim 8, after "to the" insert -- secure --.

In column 20, line 7, in Claim 8, after "by" delete "any".

In column 20, line 9, in Claim 8, delete "a" and insert -- any --, therefor.

In column 20, line 54, in Claim 13, after "by" delete "the".

Signed and Sealed this  
Tenth Day of May, 2011

David J. Kappos  
*Director of the United States Patent and Trademark Office*